United States Patent Office 3,484,125
Patented Dec. 16, 1969

3,484,125
STRUCTURAL CONNECTION BETWEEN MEMBERS SUBJECTED TO HIGH STRESSES
Victor Randour, Aurora, Ill., assignor to Caterpillar Tractor Co., Peoria, Ill., a corporation of California
Filed July 23, 1968, Ser. No. 746,795
Int. Cl. F16b 9/00, 17/00
U.S. Cl. 287—20.3        3 Claims

ABSTRACT OF THE DISCLOSURE

An assembly forming a connection between two beams, one of which is disposed within the other which assembly includes tapered pins and tapered sockets and a single stud with adjustable nuts thereon for drawing all of the tapers of the pins and their respective sockets into tight engagement.

---

Figure 1:
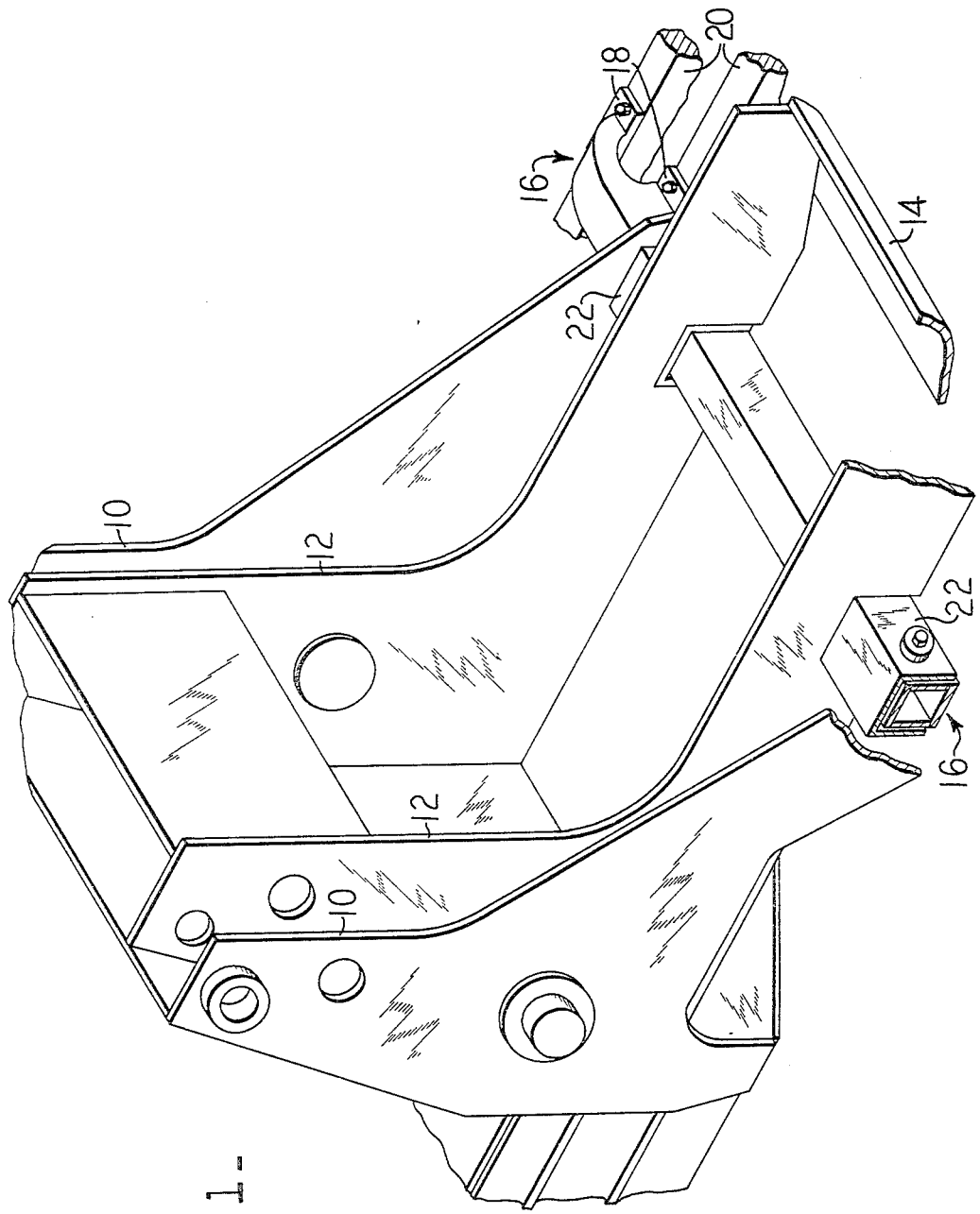

There are many structural connections as for example between parts of large earthmoving machines where shock and stress to which the parts are subjected in use cause frequent failure of the parts or the connecting means. Welding is to be avoided in many cases because of residual welding stresses which often complicate the problems encountered in such structural connections. Bolts and nuts are found to work loose, because manufacturing tolerances make it necessary to use oversized or slotted holes to allow assembly of large structural members on a production line basis. This allows relative movement with ensuing wear and failure.

A specific area in which the difficulties referred to are encountered resides in the connections between the loader support beam which spans the tractor frame members and to which the support frame is connected. This particular location will be used as an example in describing the invention for the sake of clarity in the following specification wherein reference is made to the accompanying drawings illustrating the invention in a preferred form.

Figure 2:
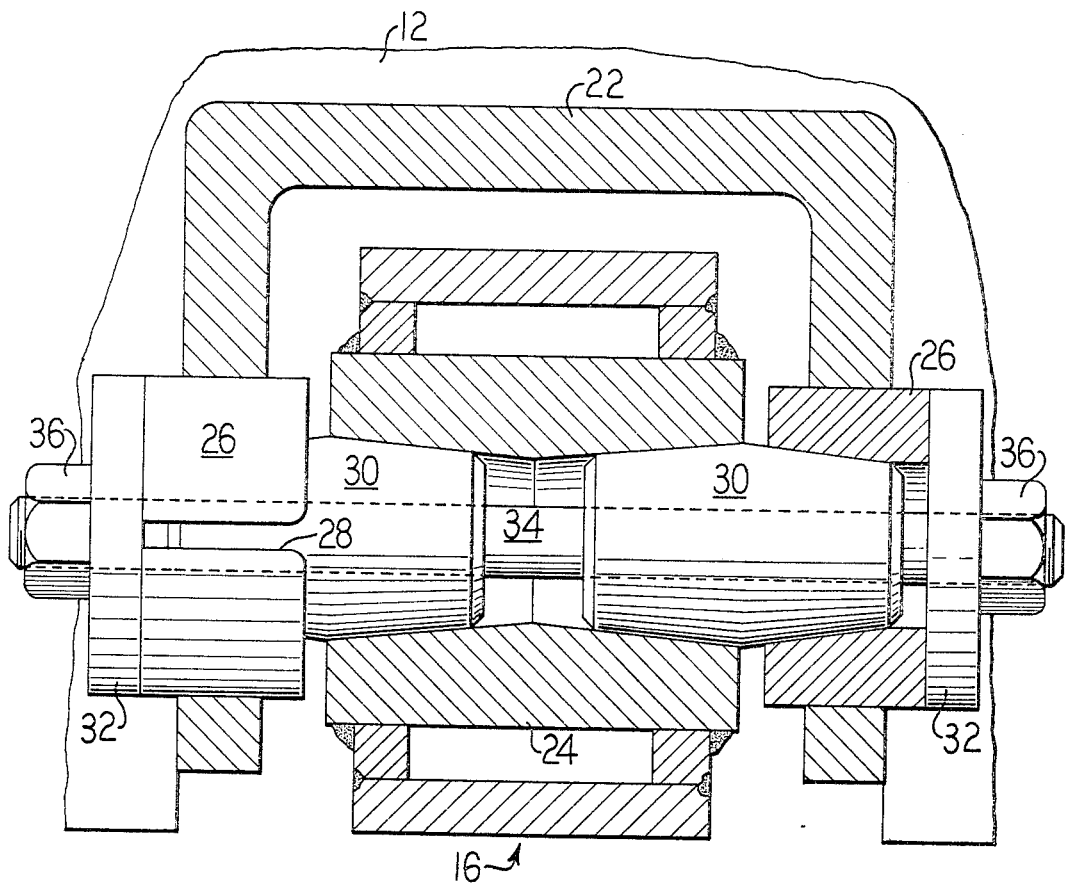

In the drawings:

FIG. 1 is a perspective view of a portion of a loader support frame showing a support beam upon which it rests and the location of the assembly of the present invention which forms a connection between the loader support frame and the support beam; and FIG. 2 is a sectional view taken through the connection assembly illustrating the location of its several parts.

FIG. 1 illustrates a typical loader support frame as having two upstanding members generally referred to as towers, each formed of a pair of spaced plates 10 and 12 provided with suitable openings for the reception of pins or bearings about which the conventional lift arms and tilt linkage swing in a vertical plane. The lower portion of the tower plates 12 extend forwardly and are joined at their forward ends by a transverse connecting brace 14 which also serves as a part of the so-called belly guard of the tractor. The forwardly extending portions of the plate 12 are supported with respect to the tractor frame-work by means of a support beam shown at 16 as a box-shaped beam which extends transversely between the tractor frames.

The present illustration is one of a loader support frame for a track-type tractor and one end of the support means 16 is shown as having pads 18 suitably bolted or otherwise secured to the track roller frames, portions of which are shown at 20. The same construction is used on the opposite side of the tractor but omitted in this illustration for the purpose of better disclosing the connection assembly.

Between each pair of tower plates 10 and 12 is an inverted U-shaped brace or beam 22 which embraces the box-like support beams 16 and is secured with respect thereto by the structural connection of the present invention which is shown in detail in FIG. 2 of the drawing.

FIG. 2 is a sectional view through the support beam 16 and the U-shaped beam 22. The beam 16 is shown as having a double tapered socket member 24 extending through suitable openings in its side walls and securely welded thereto. A single tapered socket 26 is disposed in suitable openings in the side walls of the beam 22 in axial alignment with the double socket 24. The single sockets 26 are split as shown at 28 on the left side of the view. The single sockets are not welded nor otherwise permanently secured to the side walls of the bracket 22 but are free to slide therein as well as to expand with relation to the openings in which they are fitted. Two double tapered pins 30 are employed each having one tapered end in the socket 24 and its opposite tapered end in one of the sockets 26. A pressure plate 32 is disposed outwardly of the sockets 26 and a stud 34 extends through the entire assembly and has a nut 36 threaded on each of its ends.

With the parts of the structural connection assembled in the manner description and shown in FIG. 2, tightening of the nuts 36 tends to force the pins 30 into firm engagement with the tapered sockets in the member 24. At the same time, the sockets 26 are drawn inwardly not only forming a firm connection with the tapered ends of the pins 30, but being expanded by the pins so that their external diameters are enlarged and become tightly fitted in the openings in the said walls of the bracket 22.

It is conceivable that the stud 34 could be in the form of a bolt with a nut on one end only but the ability to impart stress from opposite ends is helpful in maintaining the entire assembly in a desired centered position. The nuts are tightened to a point where the metal of the stud 34 is stressed or stretched so that there is a constant resilient force tending to hold all of the parts in the tight-fitting relationship which is brought about by the configuration of the tapered pins and sockets. The relative location between members 16 and 22 can vary in the fore and aft direction to permit assembly of two members which are not precisely machined, without affecting the ability of the connection to function properly.

What is claimed is:

1. A structural connection between two beam-like members each having spaced parallel walls and one being disposed within the other comprising a double tapered socket member fixed to and opening outwardly of the walls of the inner beam member, a single tapered socket member extending through and opening inwardly of each of the outer beam member walls and in axial alignment with the double tapered socket members, a double tapered pin in each end of the double tapered socket and each having its opposite end extending into one of the single tapered sockets, and means to draw the single tapered socket members inwardly toward the double tapered socket member to tighten the tapered connections.

2. The connection of claim 1 in which the last means includes a stud with a threaded nut on at least one end.

3. The connection of claim 1 in which the single socket members are split to enable them to expand outwardly into openings in the walls which receive them.

References Cited

UNITED STATES PATENTS

| | | | |
|---|---|---|---|
| 1,132,348 | 3/1915 | Hunter | 287—100 |
| 2,210,790 | 8/1940 | Bernhard | 287—20.3 XR |
| 2,692,756 | 10/1954 | Lincoln | 287—100 XR |

FOREIGN PATENTS 102,442  12/1923  Switzerland.

REINALDO P. MACHADO, Primary Examiner

ANDREW V. KUNDRAT, Assistant Examiner

U.S. Cl. X.R.

287—100